(12) United States Patent
Christou

(10) Patent No.: US 9,012,824 B2
(45) Date of Patent: Apr. 21, 2015

(54) LOW-HEAT-TRANSFER INTERFACE BETWEEN METAL PARTS

(75) Inventor: Kyriakos C. Christou, Tucson, AZ (US)

(73) Assignee: Raytheon Company, Waltham, MA (US)

(*) Notice: Subject to any disclaimer, the term of this patent is extended or adjusted under 35 U.S.C. 154(b) by 559 days.

(21) Appl. No.: 13/048,942

(22) Filed: Mar. 16, 2011

(65) Prior Publication Data

US 2012/0234967 A1 Sep. 20, 2012

(51) Int. Cl.
| | |
|---|---|
| *B64C 3/28* | (2006.01) |
| *F01D 25/00* | (2006.01) |
| *B23P 9/02* | (2006.01) |
| *F16B 5/04* | (2006.01) |
| *F42B 10/04* | (2006.01) |
| *F42B 10/06* | (2006.01) |
| *F42B 10/14* | (2006.01) |
| *F42B 10/64* | (2006.01) |

(52) U.S. Cl.
CPC . *F01D 25/00* (2013.01); *B23P 9/02* (2013.01); *F05D 2250/60* (2013.01); *F16B 5/04* (2013.01); *F42B 10/04* (2013.01); *F42B 10/06* (2013.01); *F42B 10/14* (2013.01); *F42B 10/64* (2013.01)

(58) Field of Classification Search
USPC ............. 244/3.24, 117 A, 124; 403/355, 381, 403/408.1; 165/133; 416/224
See application file for complete search history.

(56) References Cited

U.S. PATENT DOCUMENTS

| | | | | |
|---|---|---|---|---|
| 3,114,524 | A * | 12/1963 | Conn, Jr. et al. .......... | 244/117 A |
| 3,215,511 | A * | 11/1965 | Chisholm et al. ............ | 428/564 |
| 3,317,356 | A * | 5/1967 | Clendinning ................. | 148/220 |
| 3,430,898 | A * | 3/1969 | Parechanian et al. ......... | 244/121 |
| 4,121,894 | A * | 10/1978 | Cretella et al. ............ | 416/213 R |
| 4,693,435 | A * | 9/1987 | Percival et al. ................. | 244/91 |
| 5,348,210 | A * | 9/1994 | Linzell .......................... | 228/115 |
| 5,358,379 | A * | 10/1994 | Pepperman et al. .......... | 415/191 |
| 6,367,740 | B1 * | 4/2002 | Johnson et al. ............. | 244/45 R |
| 6,548,794 | B2 * | 4/2003 | Facciano et al. ............... | 244/3.1 |

(Continued)

FOREIGN PATENT DOCUMENTS

WO 2011064406 A1 6/2011

OTHER PUBLICATIONS

Influence of Surface Roughness and Waviness Upon Thermal Contact Resistance. Yovanovich, Milan, et al. Massachusetts Institute of Technology, Jun. 1967.*

(Continued)

*Primary Examiner* — Philip J Bonzell
*Assistant Examiner* — Michael Kreiner
(74) *Attorney, Agent, or Firm* — Renner, Otto, Boisselle & Sklar, LLP

(57) ABSTRACT

A low-heat-transfer coupling or assembly is configured to mechanically couple together a pair of mating parts, one of which may be in a heat-producing environment. By roughening at least part of the surface of one of the parts, the contact area between the mating parts can be reduced, while still maintaining the structural integrity of the connection. The roughening can be a knurling process of all or part of the mating surface on one of the parts. This can produce a series of recesses on the surface that are in contact with the other part. The recesses can be small enough, interspersed with non-etched areas of the contact surface, that structural integrity of the coupling between the parts is still maintained. The coupling may be between a leading edge of an aircraft control surface, such as a missile fin, and a body of the control surface.

20 Claims, 3 Drawing Sheets

(56) References Cited

U.S. PATENT DOCUMENTS

| | | |
|---|---|---|
| 6,594,936 B1 | 7/2003 | Sniezak et al. |
| 6,717,095 B2 * | 4/2004 | Arness et al. ............... 219/69.17 |
| 7,597,934 B2 * | 10/2009 | Nagaraj et al. ............. 427/397.7 |
| 2009/0101755 A1 * | 4/2009 | Brice et al. ................. 244/117 A |
| 2011/0033281 A1 | 2/2011 | Inomata et al. |

OTHER PUBLICATIONS

Messler, Robert. Integral Mechanical Attachment. Jun. 2006. pp. 72-73.*

International Search Report and Written Opinion from corresponding International Application No. PCT/US11/57961.

* cited by examiner

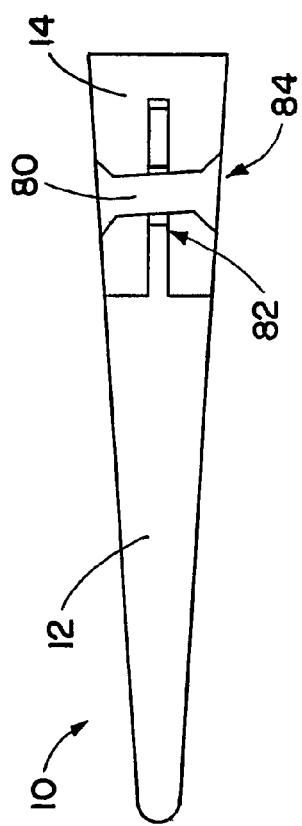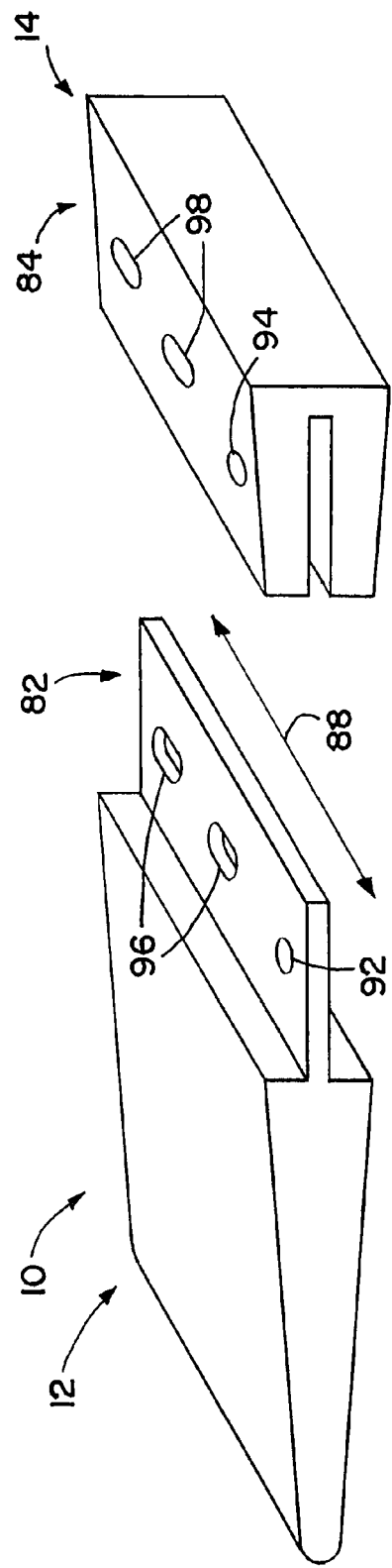
FIG. 3
FIG. 4

LOW-HEAT-TRANSFER INTERFACE BETWEEN METAL PARTS

This invention was made with United States Government support under Contract Number HQ0276-08-C-0001 with The Department of Defense. The United States Government has certain rights in this invention.

BACKGROUND OF THE INVENTION

1. Field of the Invention

The present invention relates to couplings between metal parts.

2. Description of the Related Art

Extreme thermal environments are encountered in a wide variety of fields of endeavor. One such field is that of high-speed missiles, such as missile defense missiles, where the high speeds result in heat build up on exposed surfaces, such as the leading edges of fins or other control surfaces.

Refractory metals with high service temperature will mitigate the extreme thermal environments. However refractory metals are hard to machine, have high mass densities, and are costly. Weight and cost are significant constraints for high-speed missiles. Therefore there is room for improvement in devices that encounter extreme thermal environments.

SUMMARY OF THE INVENTION

According to an aspect of an invention, a refractory metal (or alloy) part is mated to a non-refractory-metal part, with the mating surfaces of one of the parts being roughened to reduce contact area.

According to a further aspect of the invention, a refractory metal (or alloy) part is mated to a non-refractory-metal part, with the mating surfaces of one of the parts being coated to reduce heat transfer and/or to protect the part from damage.

According to a still further aspect of the invention, a pair of mating parts have between them a low-heat-transfer interface that includes a coating on one of the parts, and surface roughening of the other part to reduce contact area.

According to another aspect of the invention, a low-heat-transfer assembly includes: a first part configured for use in a heat-producing environment; and a second part that mates with the first part. The first part has a roughened surface where the first part is in contact with the second part. The roughened surface reduces contact area between the first part and the second part, relative to contact that would be produced by a smooth surface in place of the rough surface, with the roughened surface area having a contact area reduction of 40% to 80% relative to the smooth surface.

According to yet another aspect of the invention, a method of interface mating parts includes the steps of: roughening surfaces of a refractory-metal-containing first part, so as to reduce the contact area of the roughened surfaces; bringing the refractory-metal-containing first part into engagement with a second part, wherein the roughened surfaces are in contact with corresponding surfaces of the second part; and securing the parts together.

According to still another aspect of the invention, a missile control surface assembly includes: a refractory-metal-containing leading edge; and a metal main body coupled to the leading edge. The refractory-metal-containing leading edge has roughened surfaces that are in contact with coated surfaces of the main body. The roughened surfaces reduce contact area between the leading edge and the main body, relative to contact that would be produced by smooth surfaces in place of the rough surfaces, with the roughened surfaces area having a contact area reduction of 40% to 80% relative to the smooth surfaces.

According to a further aspect of the invention, a method of heat transfer management includes: providing a refractory-metal-containing part for use in a heat-producing environment; roughening surfaces of the refractory-metal-containing part, to thereby reduce contact area of the roughened surfaces; and bringing the refractory-metal-containing part into engagement with a second part, with the roughened surfaces coming into contact with the second part. The roughened surfaces may come into contact with coated surfaces of the second part, with the coating containing a ceramic material or another low-thermal-conductivity material, a material having a lower thermal conductivity than metals. The parts may be riveted together.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The annexed drawings, which are not necessarily to scale, show various aspects of the invention.

FIG. 3 is a cross-sectional view of a different cross section of the device or assembly of FIG. 1, showing a rivet connecting the mating parts.

FIG. 4 is another exploded view of part of the device or assembly of FIG. 1.

DETAILED DESCRIPTION

A low-heat-transfer interface or assembly is configured to mechanically couple together a pair of mating parts, one of which may be in a heat-producing environment. By roughening at least part of the surface of one of the parts, the contact area between the mating parts can be reduced, while still maintaining the structural integrity of the connection. The roughening can be a knurling process of all or part of the mating surface on one of the parts, for example using laser etching with an etching mask. This can produce a series of recesses on the surface that are in contact with the other part. The recesses can be small enough, interspersed with non-etched areas of the contact surface, that structural integrity of the coupling between the parts is still maintained. The interface may be between a leading edge of an aircraft control surface, such as a missile fin, and a body of the control surface.

Figure 1:
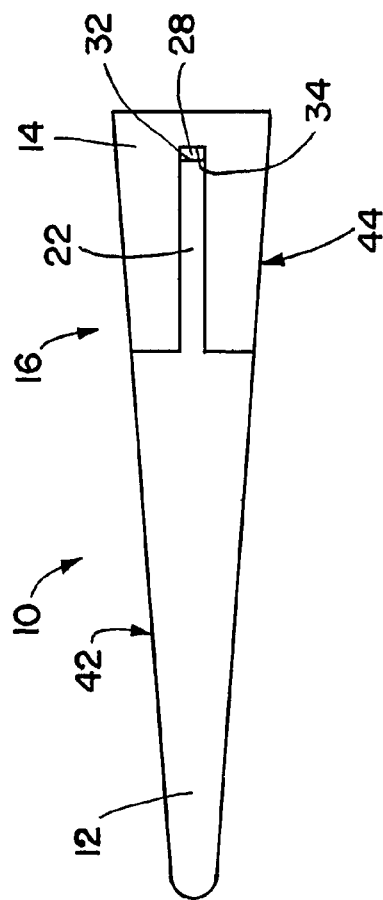
FIG. 1 is a cross-sectional view of a low-heat-transfer device or assembly in accordance with an embodiment of the present invention.
Figure 2:
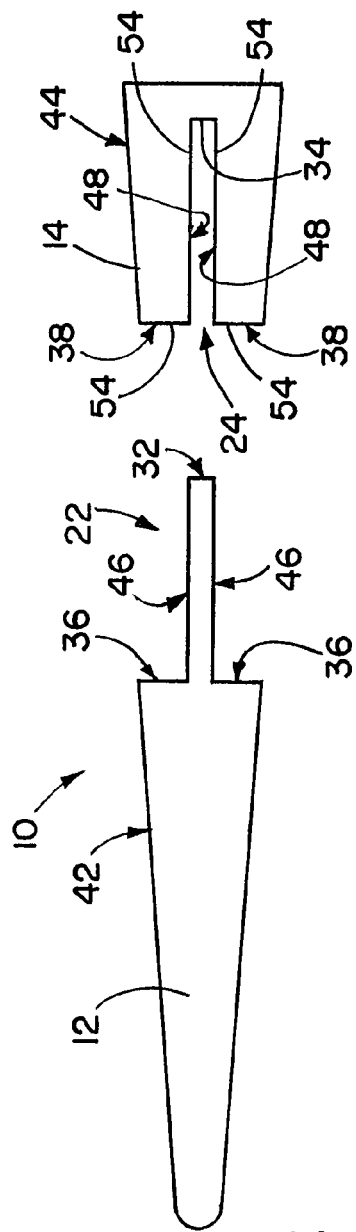
FIG. 2 is an exploded view of part of the device or assembly of FIG. 1.

FIGS. 1 and 2 show a device or assembly 10 that includes a pair of mating parts 12 and 14, mechanically coupled together at a connection or coupling 16 between the parts 12 and 14. The illustrated device 10 is part of an aircraft control surface, such as a fin of a missile, but it will be appreciated that the device 10 may be any of a wide variety of devices.

The connection or coupling 16 involves a tongue or protrusion 22 of the first part 12 being inserted into a corresponding groove or slot 24 in the second part 14. The tongue 22 may be secured in the groove 24 through any of a variety of mechanisms, some of which are discussed further below.

The first part 12 is in a heat-producing environment, and the connection or coupling 16 is a low-heat-transfer interface configured to prevent heat transfer from the first part 12 to the second part 14, while still having good structural integrity between the parts 12 and 14.

Although the parts 12 and 14 are described above as mating parts, it will be appreciated that the engaging portions of the parts 12 and 14 may not have substantially identical shapes. In particular there may be a gap 28 between a distal end surface 32 of the tongue 22, and a bottom surface 34 of the groove 24. The gap 28 may reduce the amount of surface area of the parts 12 and 14 that are in contact, reducing the amount of heat transfer across the coupling 16. In addition the gap 28 may aid in ensuring contact between other mating surfaces 36 and 38 of the two parts 12 and 14. This allows for a substantially seamless mating between an outer surface 42 of the first part 12, and an outer surface 44 of the second part 14, with substantially no gap between the outer surfaces 42 and 44. It will be appreciated that a surface that is substantially seamless and/or has substantially no gaps may be advantageous in many applications, for example on an airfoil or control surface of aircraft.

The surfaces of one of the parts 12 and 14 may be roughened, so as to reduce the contact area between the parts 12 and 14. In the illustrated embodiment the surfaces 36 of the first part 12 are roughened, as are side mating surfaces 46 of the tongue or protrusions 22. The roughening may be accomplished by selectively removing material on parts of the surfaces 36 and 46, for example by a knurling or etching process. The surfaces 36 and 46 may be suitably altered to create small recesses, niches, or depressions in the material. The surfaces 36 and 46 thus may have an array of peaks and valleys, reducing the effective contact area of the roughened surface. The air-filled pockets in the valleys contribute very little of the heat transfer across the coupling 16, since air has a much smaller thermal conductivity than the solid materials in the parts 12 and 14. Even with the roughened surfaces it is desirable for the coupling 16 to maintain its structural integrity, for example to be able to transmit forces between the parts 12 and 14.

One way the surfaces 36 and 46 may be roughened is by laser etching. Laser etching may be a suitable way of creating recesses or depressions in a hard material, such as titanium-zirconium-molybdenum alloys (TZM), which may be difficult to machine. Laser etching may be performed by masked or maskless etching processes, and a wide variety of other roughening processes may also be available as suitable alternatives, depending on the material used, and the qualities of roughness desired (e.g., size of recesses, spacing of recesses, and repeatability of recess formation and spacing).

The recesses or depressions of the surfaces 36 and 46 may have a depth of 0.25 to 2.5 mm, for example. The lateral extent of the recesses may be from 0.5 to 3 mm, for example. However other suitable depths may be possible. Any of a variety of suitable knurling patterns may be used.

The roughened surfaces 36 and 46 have a reduced contact area relative to smooth surfaces (surfaces that have not been roughened). The roughened surfaces 36 and 46 may have at least 40% of their contact area removed by roughening, or more narrowly may have at least 50% of their contact area removed by roughening. An upper bound may also be placed on the amount of contact area removed, for example limiting the removal to 75% or 80%, for instance so as to maintain structural integrity in the coupling 16 between the parts 12 and 14. Thus the amount of contact area removed by the surface roughening may be from 40% to 75%, may be from 50% to 75%, may be from 40% to 80%, or may be from 50% to 80%. It will be appreciated that these percentages are only examples, and that other reductions in contact area are possible.

The parts 12 and 14 may be metal parts, made of different materials and having different properties. In general, the first part 12 may be made of a material that is better able to withstand heat than the material of the second part 14. As noted above the first part 12 may be made of TZM. More broadly, the first part 12 may be made of a refractory metal, or alloys that include refractory metals. Refractory metals, as the term is used herein, refers to one or more of titanium, zirconium, niobium, molybdenum, ruthenium, iridium, hafnium, tantalum, tungsten, osmium, vanadium, chromium, rhenium, and rhodium. The second part 14 may be made of a nickel-chromium-based high-performance alloy, for example an alloy marketed under the trademark INCONEL. More broadly, the second part 14 may be made of a wide variety of metals or alloys, although it will be expected that the material of the second part 14 will be other than a refractory metal or an alloy of such a metal. The parts 12 and 14 may have different properties, such as different thermal conductivities, different thermal expansion coefficients, and/or different hardness, to give a few examples. The first part 12 may be more suitable for high temperature operations than the second part 14, for example with the first part 12 being made of a material having a service temperature above 1000° C., and the second part being made of a material having a service temperature below 1000° C.

The first part 12 may be harder that the second part 14. Surfaces 38 and 48 of the second part 14, which engage the surfaces 36 and 46 of the first part 12, may have coatings 54 on them. The coatings 54 inhibit heat transfer between the parts 12 and 14 (heat transfer through the connection or coupling 16). This may be due to the coatings 54 being made of a material with a lower thermal conductivity than that of either of the materials of the parts 12 and 14. The coatings 54 may thus serve as thermal insulation for the second part 14. In addition the coatings 54 may protect the surfaces 38 and 48 from damage due to contact with the surfaces 36 and 38. This may be accomplished by having the coatings 54 being of a harder material than that of the second part 14. Suitable materials for the coatings 54 include alumina and zirconium dioxide. More broadly, a low-thermal-conductivity ceramic material may be used for the coatings 54. Another suitable material would be epoxy polyamide. The coatings 54 may have a thickness of 0.025-0.05 mm (0.001-0.002 inches), although it will be appreciated that other thicknesses are possible. The coatings 54 may be applied by any of a variety of suitable known coating methods, such as physical vapor deposition, chemical vapor deposition, or spraying methods. The type of coating mechanism utilized may depend on the specific coating material used.

The surface roughening and the coatings may combine together to aid in reducing heat transfer across the coupling 16. Together the roughening and the coatings may prevent a considerable amount of the heat transfer across the coupling 16, relative to an unroughened and uncoated mating between the parts 12 and 14.

It will be appreciated that many variations are possible on the configuration shown in the figures and described above. For instance, some or all of the features/characteristics of the first part 12 and the second part 14 may be reversed, with for instance the second part 14 having roughened, reduced-contact-area surfaces, and the first part 12 having coatings on its surfaces.

The mating parts 12 and 14 may be held together through any of a variety of suitable means or methods. The mating parts 12 and 14 may initially have a slip fit or press fit between them, which may be able to secure the parts 12 and 14 together, at least before any heating of them occurs. Heating of the parts 12 and 14 may weaken a press fit or other interference fit, for example by an opening up of the groove 24. TZM has a coefficient of thermal expansion of 5.30 μm/m-° C., while INCONEL 718 has a coefficient of thermal expansion of 13.0 μm/m-° C., meaning that an overall rise in temperature may tend open up the fit between the tongue 22 and the groove 24. In addition the parts 12 and 14 may encounter forces that tend to separate them. Therefore it is desirable that the parts 12 and 14 be more actively secured together.

FIG. 3 shows a cross-section of one possible securing method for the device 10, with a rivet 80 used to secure together the mating parts 12 and 14. The rivet 80 passes through a first rivet hole 82 in the first part 12, and a second rivet hole 84 in the second part 14. The rivet 80 may be made of the same material as the second part 14, for example being made of a nickel-chromium-based high-performance alloy such as an alloy marketed under the trademark INCONEL. The rivet 80 may therefore be tightly fit with the second rivet hole 84, since there may be little or no difference in thermal expansion between the rivet 80 and the second part 14. However there may be clearance between the rivet 80 and the first rivet hole 82, in order to ameliorate possible stresses during thermal expansion between the rivet 80 and the first part 12. It will be appreciated that the device 10 may have a cross-sectional appearance between portions of the device 10 where the rivets 80 are located such as shown in FIG. 1.

With reference now in addition to FIG. 4, a series of the rivet holes 82 and 84 may include holes with different shapes, in order to avoid stresses by thermal expansion in a longitudinal direction 88. The rivet holes 92 and 94 at a longitudinal location, such as at an end of the device 10, may have a circular shape. The mating parts 12 and 14 are securely fixed together at the rivet holes 92 and 94, with the parts 12 and 14 not shifting relative to one another at that location. The other rivet holes 96 and 98, spaced along the mating parts 12 and 14 in the longitudinal direction 88, may have slotted shapes. The slotted rivet holes 96 and 98 may be elongated, having a greater extent in the longitudinal direction 88. This allows some relative shifting of corresponding portions of the mating parts 12 and 14, for instance due to differences in expansion coefficients and/or uneven heating.

There may be a spacing of about 25 mm (1 inch) between adjacent of the rivet hole pairs 92/94. It will be appreciated that this is only an example value, and that other suitable spacing of the rivets 80 may be used.

Figure 5:
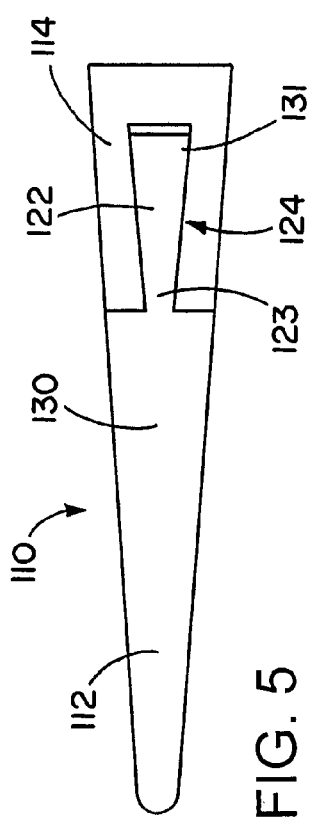
FIG. 5 is a cross-sectional view of a low-heat-transfer device or assembly in accordance with an alternate embodiment of the present invention.
Figure 6:
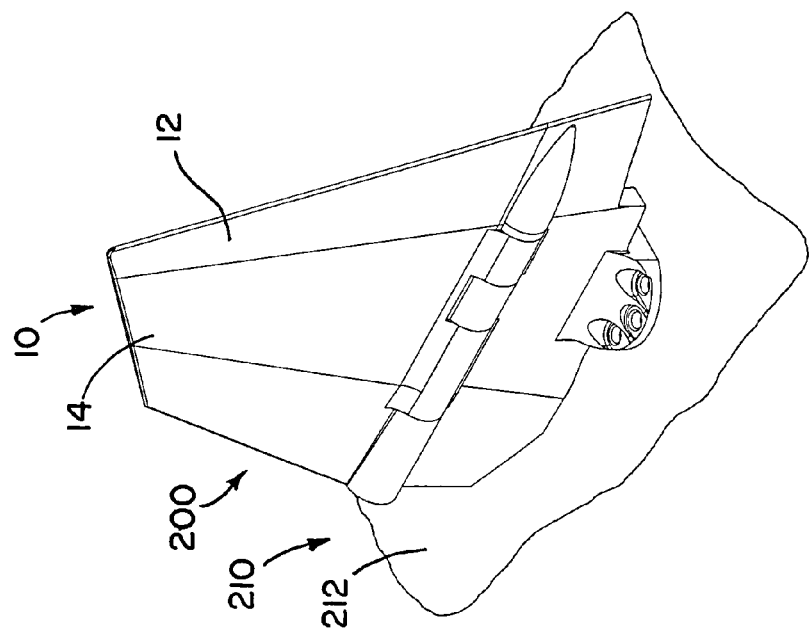
FIG. 6 is a cross-sectional view of a different cross section of the device or assembly of FIG. 5, showing a rivet connecting the mating parts.

FIGS. 5 and 6 show an alternative device 110, having a dovetail fit between a first part 112 and a second part 114, with a connection or coupling 116 between them. A tongue 122 of the first part 112 has a wedge shape cross section, being narrower at a proximal end 123 where it joins a body 130 of the first part 112, and wider at a distal end 131 that is away from the body 130. A groove 124 in the second part 114 has a wedge shape cross section that corresponds to the shape of the tongue 122. The parts 112 and 114 are assembled together by inserting the tongue 122 into the groove 124 from the side (the direction into the paper in FIGS. 5 and 6).

The parts 112 and 114 may be held together using rivets 180. However it will be appreciated that the rivets 180 may be omitted if desired, with a fitted connection (such as shrink fitting) between the tongue 122 and the groove 124 being relied upon to hold the parts 112 and 114 together. The amount of pre-stress can be estimated for both the rivet initial loading and/or for the shrink fit between the mating parts.

In other aspects the device 110 may have similar characteristics and features to the device 10 (FIG. 1) described above. Examples of these common characteristics/features include materials of the mating parts, roughened surfaces, and coatings.

Figure 7:
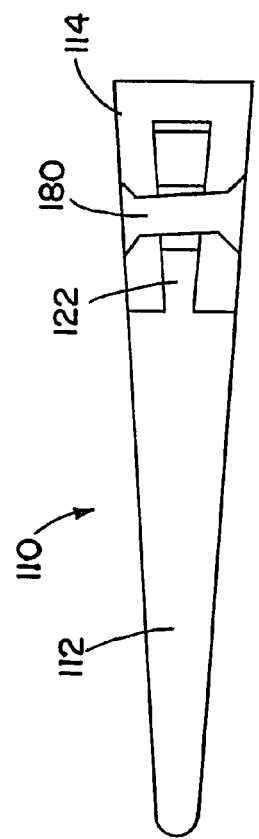
FIG. 7 is an oblique view of part of a missile that has a control surface assembly in accordance with an embodiment of the present invention.

The devices 10 and 110 may be used in any of a variety of situations where a portion of a device is in a heat-producing environment. One example is illustrated in FIG. 7, where the device 10 is shown as part of an aircraft control surface assembly 200, such as a fin of a missile 210, coupled to a fuselage 212 of the missile 210. At high speeds, such as may be encountered for high-speed missile-defense missiles, leading edge temperatures of fins or other control surfaces may increase greatly over ambient temperatures. It may be desirable to at least inhibit transfer of heat from the leading edge part 12 to a part 14 that constitutes the main body of the control surface assembly 200. It will be appreciated that there are many other sorts of control surfaces that have leading edges, such as wings, canards, elevators, and rudders. It will also be appreciated that other sorts of high-speed aircraft surfaces, such as strakes used to improve air flow, also may have heat build up that would make them suitable candidates for use of a device such as the device 10.

Another possible application for the device 10 is in crucible electrodes, which are typically made of TZM or molybdenum. Heat transfer from the electrode to supporting structure may be reduced by use of devices such as those described herein.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A low-heat-transfer assembly comprising:
    a first part configured for use in a heat-producing environment; and a second part that mates with the first part in an interference fit;

wherein the first part has a roughened surface where the first part is in contact with the second part;

wherein the roughened surface reduces contact area between the first part and the second part, relative to contact that would be produced by a smooth surface in place of the rough surface, with the roughened surface area having a contact area reduction of 40% to 80% relative to the smooth surface;

wherein the second part includes a coating on surfaces of the second part where the second part is in contact with the fist part; and wherein the coating and second part are composed of the materials different from one another.

2. The assembly of claim 1, wherein the roughened surface is a knurled surface.

3. The assembly of claim 1, wherein the roughened surface is a laser etched surface.

4. The assembly of claim 1, wherein the first part and the second part are both metal parts.

5. The assembly of claim 4, wherein the first part includes a refractory metal or an alloy containing a refractory metal.

6. The assembly of claim 4,
wherein the first part is made of a material having a service temperature above 1000° C.; and
wherein the second part is made of a material having a service temperature below 1000° C.

7. The assembly of claim 1, wherein the coating includes a ceramic material.

8. The assembly of claim 1, wherein the coating includes at least one of silicon carbide or zirconium dioxide.

9. The assembly of claim 1, wherein the first part includes a protrusion that is in a slot in the second part.

10. The assembly of claim 9, wherein the roughened surface includes side surfaces of the protrusion that are engaged with side surfaces of the slot.

11. The assembly of claim 9, wherein a gap is defined between a distal end surface of the protrusion, and a bottom surface of the slot.

12. The assembly of claim 9,
further comprising rivets that secure the first part and the second part together;
wherein the rivets pass through first rivet holes in the first part, and second rivet holes in the second part.

13. The assembly of claim 12,
wherein at least one of the first rivet holes is a substantially circular hole, and wherein other of the first rivet holes are slotted holes that have a greater extent in one direction than they do in another direction that is perpendicular to the one direction; and
wherein at least one of the second rivet holes is a substantially circular hole, and wherein other of the second rivet holes are slotted holes that have a greater extent in one direction than they do in another direction that is perpendicular to the one direction.

14. The assembly of claim 9,
wherein protrusion has a wedge shape, widening from a relatively narrow proximal end that is coupled to a body of the first part, to a relatively broad distal end away from the body; and wherein the slot has a wedge shape that corresponds to the wedge shape of the protrusion.

15. The assembly of claim 1, wherein the roughened surface area has a contact area reduction of 50% to 75% relative to the smooth surface.

16. The assembly of claim 1,
wherein the roughened surface includes recesses, thereby reducing the contact area between the first part and the second part, and
wherein the recesses have a depth of 0.25 mm to 2.5 mm.

17. The assembly of claim 1, wherein the coating has a thickness of 0.025 mm to 0.05 mm.

18. A missile control surface assembly comprising:
a refractory-metal-containing leading edge; and
a metal main body coupled to the leading edge;
wherein the refractory-metal-containing leading edge has roughened surfaces that are in contact with coated surfaces of the main body;
wherein the coated surfaces are composed of a material different from the metal main body; and
wherein the roughened surfaces reduce contact area between the leading edge and the main body, relative to contact that would be produced by smooth surfaces in place of the rough surfaces, with the roughened surfaces area having a contact area reduction of 40% to 80% relative to the smooth surfaces.

19. A low-heat-transfer assembly comprising:
a first part configured for use in a heat-producing environment; and
a second part that mates with the first part in an interference fit;
wherein the first part has a roughened surface where the first part is in contact with the second part;
wherein the roughened surface reduces contact area between the first part and the second part, relative to contact that would be produced by a smooth surface in place of the roughened surface, with the roughened surface area having a contact area reduction of 40% to 80% relative to the smooth surface; and
wherein the first part includes a protrusion that is in a slot in the second part; and
further comprising rivets that secure the first part and the second part together, wherein the rivets pass through first rivet holes in the first part, and through second rivet holes in the second part.

20. The assembly of claim 19,
wherein at least one of the first rivet holes in a substantially circular hole, and wherein other of the first rivet holes are slotted holes that have a greater extent in one direction than they do in another direction that is perpendicular to the one direction; and
wherein at least one of the second rivet holes is a substantially circular hole, and wherein other of the second rivet holes are slotted holes that have a greater extent in one direction than they do in another direction that is perpendicular to the one direction.

* * * * *